3,822,302

1-(BIS(2-HYDROXYPROPYL)NITRILOETHYL-ENE)-5-STIBA-1-AZA-4,6-DIOXACYCLOOCTYL ANTIMONY-ETHER

Woodrow E. Kemp, Pittsburgh, Pa., assignor to Koppers Company, Inc.
No Drawing. Original application Jan. 26, 1972, Ser. No. 221,082, now Patent No. 3,764,378. Divided and this application July 16, 1973, Ser. No. 379,268
Int. Cl. C07f 9/90
U.S. Cl. 260—446    1 Claim

ABSTRACT OF THE DISCLOSURE

A wood preservative composition comprised of creosote in which is dissolved the novel antimony containing compound 1-(bis(2-hydroxypropyl)nitriloethylene)-5-stiba-1-aza-4,6-dioxacyclooctyl Sb-ether whose structure is

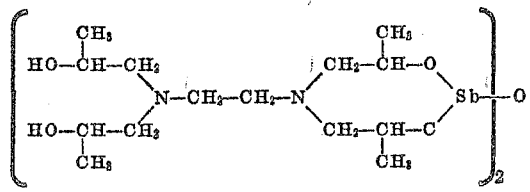

This is a division of application Ser. No. 221,082, filed Jan. 26, 1972 now Pat. No. 3,764,378.

FIELD OF THE INVENTION

This invention relates generally to a wood preservative composition, and in particular to an organic antimony compound that is soluble in creosote to provide a composition for the treating of wood.

There has now been discovered a novel antimony organic compound which is soluble in creosote and can be used for enhancing the properties of the creosote, i.e., for rendering more fire retardant the creosote which is to be used for the impregnation of wood.

BACKGROUND OF THE INVENTION

Because of its toxic properties, creosote is widely used as a wood preservative. Creosote is a distillate of the coal-tar that has been produced by the high temperature carbonization of coal; the distillate begins at about 200° C. and has a continuous boiling range of at least 125° C. It is comprised of liquid and solid aromatic hydrocarbons and contains appreciable quantities of tar acids and tar bases. Thus, creosote is not a single chemical substance but is a mixture containing a great number of aromatic compounds. When the creosote is impregnated into wood, it renders the wood toxic to fungi and most organisms.

It is desirable for many purposes that wood be not only rot resistant but fire resistant as well. Antimony trioxide has the property of flameproofing canvas. Antimony trioxide is also used in paints, lacquers, porcelain enamels, glass, and adhesive cements. As a white pigment, the hiding power of antimony trioxide is somewhat greater than that of lithopone. It is also used in conjunction with titanium dioxide to improve suspension properties and prevent chalking. During World War II, approximately one-third of the total consumption of antimony in all forms was for the treatment of canvas. The canvas or other material to be flameproofed is dipped in a compound containing antimony trioxide, chlorinated paraffin, and possibly other constituents, such as paint pigments; and the resultant canvas is flame-resistant and will not support combustion in the absence of a source of external heat.

While the dip coating of a thin material such as canvas is sufficient to protect the material, a simple coating is not sufficient to protect wooden beams or logs. The wood must be impregnated and it is difficult to force a solid, such as a pigment, into the cells of wood.

In accordance with this invention, a novel antimony compound has been found that is compatible with creosote and soluble therein. Accordingly, a wood treating composition can now include the toxic qualities of creosote and the fire retardant properties of antimony compounds.

SUMMARY OF THE INVENTION

This invention relates generally to wood treating compositions and more particularly to a solution of 1-(bis(2-hydroxypropyl)nitriloethylene)-5-stiba-1-aza-4,6-dioxacyclooctyl Sb-ether in creosote. This novel organic antimony compound has the general structure

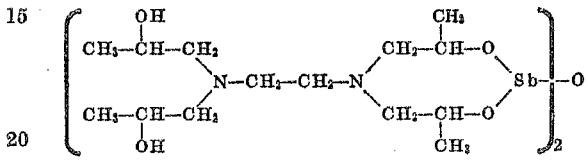

The novel antimony compound is formed by the reaction of antimony oxide ($Sb_2O_3$) with N,N,N',N'-tetrakis-(2-hydroxypropyl) ethylene diamine.

The N,N,N',N'-tetrakis(2-hydroxypropyl) ethylene diamine is readily available commercially as a viscous, water-white liquid. The antimony trioxide is commercially available as a white to buff colored solid powder.

The novel organic antimony compound is soluble in creosote. To obtain the wood treating solution, the organic antimony compound may either be formed separately and added to the creosote or may be formed in situ in the creosote. Forming the organic antimony compound in situ is advantageous when the solution of the organic antimony compound in creosote is to be used for the impregnation of wood because it then is not necessary to purify the product. The solution of the organic antimony compound in creosote may be used in the conventional manner as creosote alone is used for the impregnation of wood.

The wood may be impregnated with a solution of the organic antimony compound in creosote by either the well-known "empty cell" or "full cell" method to obtain the desired retention of the preservative in the wood. As with creosote, the amount of preservative solution of this invention to be placed in the wood will vary with the use to which the wood is to be placed. For example, 4 to 5 pounds of the preservative solution would be retained in the wood per cubic foot of wood when the wood is to be used, for example, for fence posts. For lighting poles, railroad ties, and the like, the retention, of course, increases to 5 to 12 pounds of the preservative solution per cubic foot of wood.

The organic antimony compound of this invention, the solute, can be used to the extent of forming a saturated solution in the solvent creosote. Normally, a 3–5% by weight of organic antimony compound in the creosote solution is considered sufficient to provide the additional fire retardance to the wood.

DETAILED DESCRIPTION

The invention will be illustrated more clearly by the following examples.

Example I

Two hundred sixty five grams of N,N,N',N'-tetrakis(2-hydroxypropyl)ethylene diamine is charged to a 1 liter stirrer flask equipped with a water trap. Fifty grams of xylene is added, the mixture heated to 125° C. and then 315 grams of antimony trioxide is added over a period of 5 minutes. The mixture is refluxed for 1½ hours at 107–123° C. and the water evolved from the compound formation is collected in the trap. The viscous product mixture is cooled to room temperature and this new composition of matter is purified by acetone extraction. The purified compound is pale yellow solid.

Based on a molecular weight of 840, an elemental antimony content of 29.0 (theory 28.9) and Sb—O band at 16.9 microns, and NMR analysis, the structural formula of the compound is

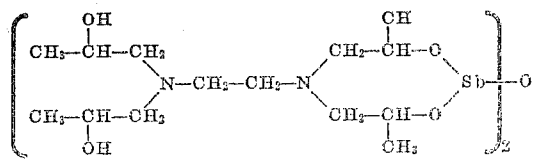

The solubility if the compound in creosote to the extent of about 30 grams of compound per 100 grams of creosote at room temperature.

Example II

To 10,000 grams of creosote was added 265 grams of N,N,N',N'-tetrakis(2-hydroxypropyl ethylene diamine). The mixture is placed in a stirrer reactor and heated to 125° C.; then a 315 grams of antimony trioxide is added over a period of 5 minutes. The mixture is heated to 125° C. and kept under agitation for a period of 2 hours. The antimony trioxide solids disappear as the reaction proceeds to form the novel compound 1-(bis(2-hydroxypropyl)nitriloethylene)-5-stiba-1-aza-4,6-dioxacyclooctyl Sb-ether in situ.

The advantage of this in situ preparation is that the novel preservative composition is produced without further treatment. The N,N,N',N'-tetrakis(2-hydroxypropyl) ethylene diamine is soluble in the creosote but the antimony trioxide is not. However, disappearance of the solids as the reaction proceeds permits the operator to determine completion of the organic reaction as the novel antimony compound of the invention is formed.

The foregoing has described a novel organic antimony compound which can be used with creosote for the treatment of wood. Treating solution can be formed by the organic antimony compound either being synthesized and then added to the cresote, or the compound being made in situ in a creosote medium. The novel treating solution can be used in conventional equipment for the impregnation of wood.

What is claimed is:
1. The compound represented by the structure

$$\left[ \begin{array}{c} HO-CH-CH_2 \\ | \\ CH_3 \\ HO-CH-CH_2 \\ | \\ CH_3 \end{array} \right. \!\!\! N-CH_2-CH_2-N \!\!\! \left. \begin{array}{c} CH_3 \\ | \\ CH_2-CH-O \\ \\ CH_2-CH-O \\ | \\ CH_3 \end{array} Sb-O \right]_2 $$

References Cited
UNITED STATES PATENTS

| | | | |
|---|---|---|---|
| 3,109,853 | 11/1963 | Worsley et al. | 260—446 |
| 3,359,218 | 12/1967 | Wiles | 260—446 |
| 3,752,837 | 8/1973 | Okuto | 260—446 |

DANIEL E. WYMAN, Primary Examiner

A. P. DEMERS, Assistant Examiner

U.S. Cl. X.R.

21—7; 106—15 FP; 117—147, 151; 424—296, 339, 346